United States Patent
Newport et al.

(10) Patent No.: US 8,438,161 B2
(45) Date of Patent: *May 7, 2013

(54) AUTONOMICALLY REGULATING INFORMATION TRANSFER WHEN ACCESSING DATABASE RESOURCES

(75) Inventors: William T. Newport, Rochester, MN (US); John Joseph Stecher, Rochester, MN (US); Robert Wisniewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/423,544

(22) Filed: Mar. 19, 2012

(65) Prior Publication Data

US 2012/0179679 A1    Jul. 12, 2012

Related U.S. Application Data

(63) Continuation of application No. 11/191,419, filed on Jul. 28, 2005, now Pat. No. 8,140,529.

(51) Int. Cl.
*G06F 17/30* (2006.01)

(52) U.S. Cl.
USPC .......................................... 707/736; 707/758

(58) Field of Classification Search .................. 707/736, 707/758
See application file for complete search history.

(56) References Cited

U.S. PATENT DOCUMENTS

| 5,146,578 A | 9/1992 | Zangenehpour |
| 5,941,981 A | 8/1999 | Tran |
| 6,539,382 B1 | 3/2003 | Byrne et al. |
| 2002/0107957 A1 | 8/2002 | Zargham et al. |
| 2004/0088292 A1 | 5/2004 | Dettinger et al. |

OTHER PUBLICATIONS

R. Dyess, "An Introduction to SQL Server Query Tuning" (Published on the World Wide Web, claimed copyright date 2003).

*Primary Examiner* — Yuk Ting Choi
(74) *Attorney, Agent, or Firm* — Roy W. Truelson

(57) ABSTRACT

A database access facility for accessing databases includes a monitoring function which monitors accesses by requestors of database data. The monitoring function tracks which database fields are requested to dynamically determine the fields which the application needs. Once sufficient tracking data is obtained, subsequent accesses to the database on behalf of an application are automatically modified by the application server to request only the fields which are likely to be needed. Preferably, the database access facility is an application server for one or middle tier applications which access the database on behalf of multiple clients in a three-tier client-server environment.

13 Claims, 8 Drawing Sheets

AUTONOMICALLY REGULATING INFORMATION TRANSFER WHEN ACCESSING DATABASE RESOURCES

CROSS REFERENCE TO RELATED APPLICATION

This is a continuation of U.S. patent application Ser. No 11/191,419, filed Jul. 28, 2005, entitled "Method and Apparatus for Autonomically Regulating Information Transfer When Accessing Database Resources", which is herein incorporated by reference. This application claims priority under 35 U.S.C. §120 of U.S. patent application Ser. No. 11/191,419, filed Jul. 28, 2005.

FIELD OF THE INVENTION

The present invention relates generally to digital data processing, and more particularly to the operation of a database serving multiple client users in a networked digital computing environment.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises hardware in the form of one or more central processing units (CPU) for processing instructions, memory for storing instructions and other data, and other supporting hardware necessary to transfer information, communicate with the external world, and so forth. From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster.

Complex systems may be used to support a variety of applications, but one common use is the support of large databases, from which information may be obtained. Conceptually, a database may be viewed as one or more tables of information, each table having a large number of entries or records (analogous to rows of a table) of a common format, each entry having multiple respective data fields (analogous to columns of the table). Database management software provides the ability to define the parameters of the database, to create new database records, edit existing records, and so forth. In particular, large databases usually support some form of database query for obtaining information which is extracted from selected database fields and records. Operations performed by database management software, and particularly database queries, can consume significant system resources.

A large database is often intended to provide information to a variety of users. Many computer systems containing large databases provide database access according to a client-server model, in which the user of the database (the client) requests some service of the database (such as the execution of a query against information in the database), and the database management software functions as a server to perform the requested service using the database information and return results (e.g., requested information, acknowledgment that an operation was performed, etc.) to the client. Use of a client-server model facilitates access to database information where the clients are located at different computer systems, often physically remote from the database system.

Client-server interaction with one or more databases can be very complex. The scope and type of information stored may vary. Databases have a particular structure, including one or more tables, structure of entries within each table, auxiliary database structures such as indexes, histograms, etc. for assisting queries, and so forth. It is desirable to shield users and or user applications from these details of database design. A family of middleware applications, herein called a "middle tier facility" or "middle tier", is often interposed between the clients and the database can provide a convenient means for accessing one or more databases. To the client, the middle tier appears as the server. I.e., the client's direct interaction is with the middle tier, which services its requests. The middle tier may contain any of various complex applications user for servicing client requests. Servicing at least some requests requires access to data in a database, although in many cases there will be other requests can be serviced entirely within the middle tier, without accessing a database. To the database, the middle tier is an intermediate application which represents multiple clients in their transactions with the database. The middle tier may support access to multiple databases, and some requests may require that data be obtained from multiple databases to satisfy the request. Data obtained from a database might be returned directly to the client, or might be processed by the middle tier to generate other data, which may be returned to the client and/or re-stored in the database. A form of client-server environment in which a client accesses a database through such middleware is sometimes referred to as a three-tier environment.

An example of such a middle tier is a facility which handles requests generated from multiple clients running interactive web browsers to access data contained in one or more databases. Typically, a user of a web browser has no knowledge of the design details of a database, and only knows the type of information in which he is interested. A middle tier facility converts the requests from the web browsers of the clients to some appropriate form for accessing a database. In many cases, a single request may require the middle tier to access multiple databases and process resulting data for the client.

It is possible to design a middle tier facility as custom-written computer programming code to support a known set of clients and access a known set of databases. However, it is generally much easier to design a middle tier from an existing shell or framework, which is then customized for the particular application or applications. Such a shell or framework for a middle tier is referred to herein as an "application server". An application server typically contains a collection of generic interfaces for different types of databases, as well as other frequently used functions or procedures. One or more customized middle tier applications run in the application server and utilize its functions to access the databases. Such an application server may be offered in an object-oriented programming form as a hierarchy of pre-defined classes, methods and objects, which may then be customized by extension. However, an application server need not be designed using object-oriented programming constructs.

In a typical environment, the middle tier facility resides in a different computer system from the databases, and communicates with the databases across a network. The applications running in the application server require access to specific records of the database to service client requests. The application server forwards database access requests across the network to the database or multiple databases, and receives selective database records responsive to these requests via the network. The application server temporarily stores these records in a local data structure, which serves the function of a cache. These records are then accessed by the applications to generate specific data required to satisfy the requests by the clients.

In an application server it is desirable to use a common generic interface to access records of a database, the common generic interface being potentially invoked from multiple different middle tier applications or procedures. Because the generic interface must support multiple different applications, it is designed to access any information which may be required from the database. Specifically, in accessing a database record, the generic interface is typically designed to obtain a full database record, i.e., all fields in a database record, whether or not all fields are actually used by the requesting application to satisfy the client request.

Where database records are being transferred across a network and stored in a local data structure in the application server, significant network bandwidth and local storage capacity may be consumed in transferred records fields which are not actually used by the middle tier applications to satisfy client requests. In such cases, it would be desirable to transfer and store only the fields which are actually required to satisfy client requests in order to reduce the consumption of network and local resources. The problem is particularly acute where generic interfaces are used, as in the case of an application server shell or framework for supporting multiple middleware applications. It is possible to design custom interfaces which will request only the minimal amount of data required from the database, but the construction of custom interfaces involves reduces the portability of applications, the re-usability of code, and generally increases the burden of code development and maintenance.

A need therefore exists for improved techniques for accessing databases in a network environment which both avoid excessive utilization of network bandwidth and other system resources, and at the same time offer the advantages of generic interfaces provided by an application server shell.

SUMMARY OF THE INVENTION

A database access facility for accessing one or more databases includes a monitoring function which monitors requests to the database access facility for database data. The monitoring function tracks which database fields are requested of the database access facility to dynamically determine the fields which are needed. Once sufficient tracking data is obtained, subsequent requests for database data are automatically modified by the database access facility to request only the fields which are actually needed (or likely to be needed) by the requestor.

In the preferred embodiment, the database access facility is an application server supporting one or more applications which require database data. The application server and one or more applications it includes are a middle tier facility of a three-tier client-server environment. The middle tier facility responds to service requests from multiple clients, and in appropriate circumstances accesses one or more databases on behalf of the clients. The application server is a framework or shell for supporting database accesses on behalf of one or more applications of the middle tier. The application server includes a set of generic database interfaces, and which maintains local cache objects of data in the database. An application within the middle tier invokes the connection facilities of the application server to obtain database access. The application server receives data from the database or databases, and uses this database data to perform the services requested by the clients. However, an application server and its applications need not constitute a middle tier facility, and alternatively could be client or end user of database data.

In the preferred embodiment, the interface between the application or applications and the application server conforms to the JAVA 2 Enterprise Edition (J2EE) specification, thereby facilitating the development, re-use and portability of applications for the application server. Upon receiving a request for database information, the application server caches certain information in a local cache object. The J2EE specification allows an application to request specific information from a database, but does not support the application's regulation of the local cache object. I.e., the application, using the J2EE interface, has no way to tell the application server which fields of a database should be cached (because they will or may be needed to perform some function). The monitoring function maintains historical data which records the fields which have been accessed by each application. Based on this historical data, the application server is enabled to make a judgment about which fields should be requested from the database, in the absence of any indication from the application. Upon the first access to a record in the database, the application server determines which fields should be accessed using the monitor's historical data, and accesses only those fields.

By reducing the number of database fields which are cached in the application server, the size of local cache objects in the application server is reduced. More importantly, in a typical networked environment, the volume of data which must be transmitted across the network is reduced. This result is accomplished in a manner consistent with a generic interface specification (specifically, the J2EE specification), and thus all the benefits of maintaining consistency with the generic interface specification are preserved. This result is further accomplished without manual intervention on the part of the client, without the need to write custom code within an application or application server for handling each application's requirements. Furthermore, the result is achieved dynamically, and the application server will automatically adjust the accessed fields if an application is subsequently modified to access different fields of the database.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
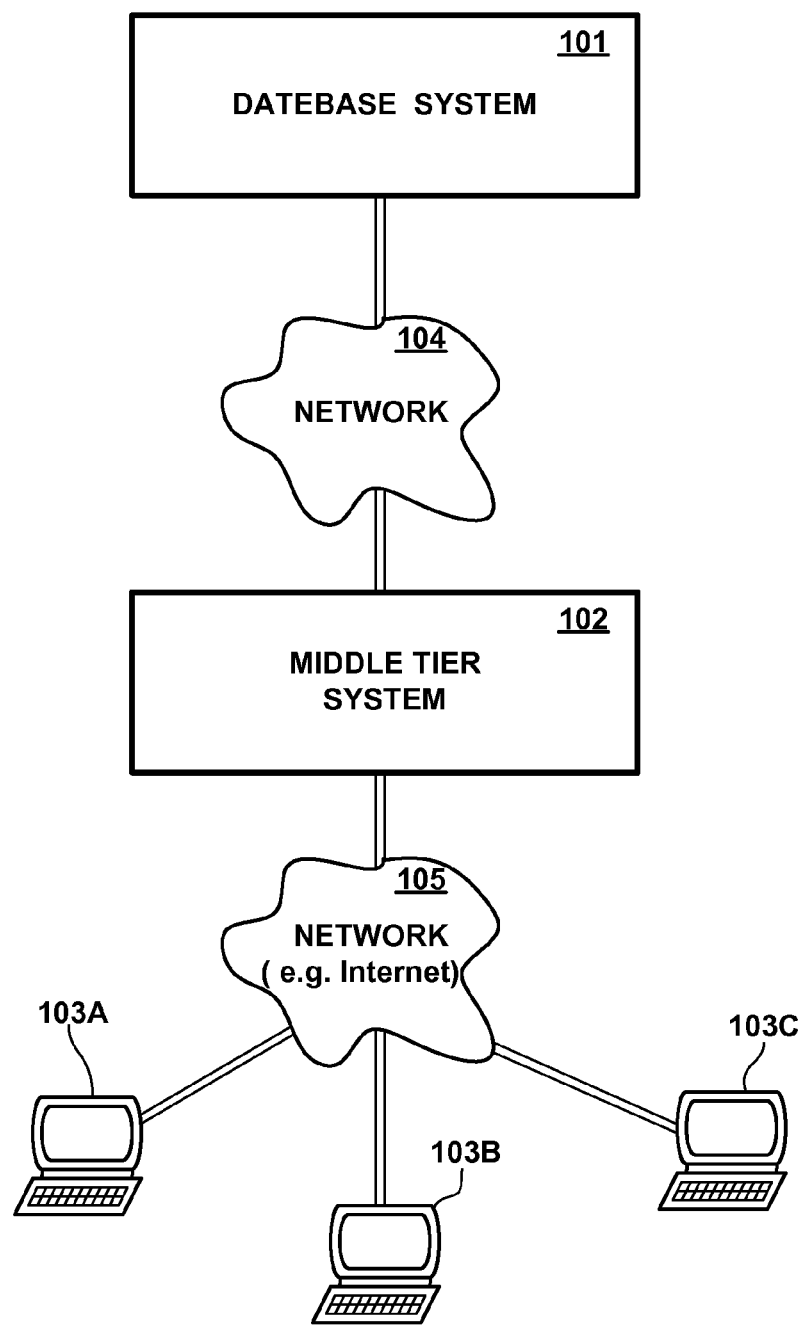
FIG. 1 is a high-level representation of a typical three-tier environment for accessing information in a database, according to the preferred embodiment of the present invention.

Referring to the Drawing, wherein like numbers denote like parts throughout the several views, FIG. 1 is a high-level representation of a typical three-tier environment for accessing information in a database, according to the preferred embodiment of the present invention. Database system 101 is a computer system containing one or more databases of information, and which functions as a server to respond to requests from clients for access to the information in the database(s). Clients 103A-C (herein generically referred to as feature 103) generate requests for service to middle tier system 102, at least some of these requests requiring access to information in the database(s) of database system 101. Middle tier system 102 acts as a server to clients 103; it may provide various services to the clients (not all of which necessarily involve database access), but in particular it functions as an intermediary between the clients 103 and the database system 101 in handling client requests to access information in the database. Where necessary to provide a requested service, middle tier system uses the client request for information in a general form to generate one or more requests to database system 101 in a specific form required by the database to be accessed. Database system 101 generates responses to those requests (e.g., copies of selective information, results of queries, acknowledgments of changes made to the information, etc.), which are transmitted to middle tier system 102, and used by middle tier system 102 to provide response to the clients. Middle tier system 102, which handles all direct interaction with clients 103, appears to the clients as the server. From the perspective of database system 101, middle tier system 102 functions as a representative of multiple clients to transmit and receive information from the clients.

Database server system 101 is coupled to middle tier system 102 by a communication path represented as network 104, and middle tier system is in turn coupled to clients 103 by a communication path represented as network 105. Networks 104, 105 could be any form of data communication paths, including broadcast media, direct links between database system 101, middle tier system 102, or one or more clients 103, or indirect links of arbitrary complexity through one or more other systems, routers, or other entities. Networks 104, 105 may be the same network (e.g., the Internet). In a typical environment, network 104 might be a local area network, while network 105 is a broader network, such as the Internet.

FIG. 1 is intended to represent a typical environment at a high level of generality, and is not intended to represent all components of an environment in detail, or all possible permutations of a three-tier or other client-server environment for accessing a database. Numerous variations of the environmental representation of FIG. 1 are possible, of which the following in particular are possible, the description of particular variations herein being intended by way of example only and not by way of limitation. Although database system 101 is shown as a single monolithic entity, it in fact may comprise multiple computer systems upon which data is stored and/or operations performed in a distributed fashion. There may in fact be multiple databases having different organization and interfaces, all accessed by a single middle tier system. Although database system 101, middle tier system 102 and clients 103 are shown as separate and distinct entities coupled by networks, some or all of these may in fact be combined in a single computer system. E.g., database system 101 and middle tier system 102 may be one and the same physical computer system which executes the two software processes of a database manager and the components of a middle tier facility, in which case there would be no physical network 104, communication between the two software processes being handled according to an appropriate inter-process communication protocol within the single computer system. Clients 103 and middle tier 102 could similarly be processes executing on the same computer system; and functions described herein as performed by the middle tier could alternatively be performed by the client directly. Although three clients 103 are represented as single-user workstations, a client could be any entity which might generate service requests requiring access to the database, and could include processes executing on large, multi-user systems; furthermore, the number of clients may vary, and is typically significantly larger than the three clients represented for illustrative purposes in FIG. 1.

Figure 2:
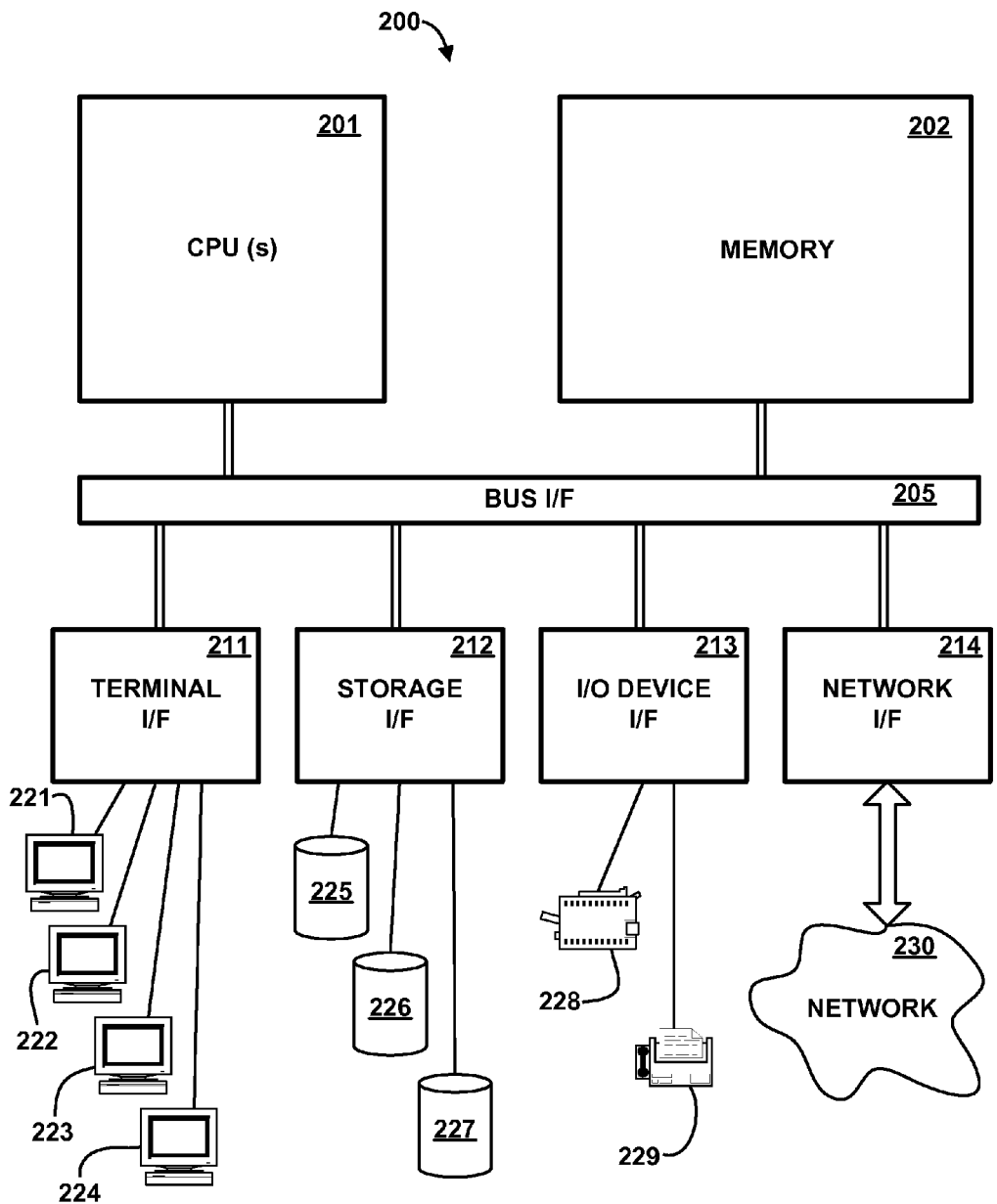
FIG. 2 is a high-level block diagram of the major hardware components of a computer system for performing services relating to database access on behalf of clients, according to the preferred embodiment.

FIG. 2 is a high-level block diagram of the major hardware components of a computer system 200 for performing services relating to database access on behalf of clients, according to the preferred embodiment. System 200 could represent the hardware components of database system 101, or could represent the hardware components of middle tier system 102, or could represent the hardware components of a single system which performs both the functions of database system 101 and middle tier system 102, as explained above. CPU 201 is at least one general-purpose programmable processor which executes instructions and processes data from main memory 202. Main memory 202 is preferably a random access memory using any of various memory technologies, in which data is loaded from storage or otherwise for processing by CPU 201.

One or more communications buses 205 provide a data communication path for transferring data among CPU 201, main memory 202 and various I/O interface units 211-214, which may also be known as I/O processors (IOPs) or I/O adapters (IOAs). The I/O interface units support communication with a variety of storage and I/O devices. For example, terminal interface unit 211 supports the attachment of one or more user terminals 221-224. Storage interface unit 212 supports the attachment of one or more direct access storage devices (DASD) 225-227 (which are typically rotating magnetic disk drive storage devices, although they could alternatively be other devices, including arrays of disk drives configured to appear as a single large storage device to a host). I/O device interface unit 213 supports the attachment of any of various other types of I/O devices, such as printer 228 and fax machine 229, it being understood that other or additional types of I/O devices could be used. Network interface 214 supports a connection to one or more external networks 230 for communication with one or more other digital devices.

Network 230 may represent either network 104 or network 105 or both, and could be embodied as any of various local or wide area networks known in the art. For example, network 230 may be an Ethernet local area network, or it may be the Internet. Additionally, network interface 214 might support connection to additional networks.

It should be understood that FIG. 2 is intended to depict the representative major components of system 200 at a high level, that individual components may have greater complexity than represented in FIG. 2, that components other than or in addition to those shown in FIG. 2 may be present, and that the number, type and configuration of such components may vary, and that a large computer system will typically have more components than represented in FIG. 2. Several particular examples of such additional complexity or additional variations are disclosed herein, it being understood that these are by way of example only and are not necessarily the only such variations.

Although only a single CPU 201 is shown for illustrative purposes in FIG. 2, computer system 200 may contain multiple CPUs, as is known in the art. Although main memory 202 is shown in FIG. 2 as a single monolithic entity, memory 202 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 205 are shown in FIG. 2 as a single entity, in fact communications among various system components is typically accomplished through a complex hierarchy of buses, interfaces, and so forth, in which higher-speed paths are used for communications between CPU 201 and memory 202, and lower speed paths are used for communications with I/O interface units 211-214. Buses 205 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate system buses 205 from various communications paths running to the various I/O devices, it would alternatively be possible to connect some or all of the I/O devices directly to one or more system buses.

Computer system 200 depicted in FIG. 2 has multiple attached terminals 221-224, such as might be typical of a multi-user "mainframe" computer system. Typically, in such a case the actual number of attached devices is greater than those shown in FIG. 2, although the present invention is not limited to systems of any particular size. User workstations or terminals which access computer system 200 might also be attached to and communicate with system 200 over network 230. Computer system 200 may alternatively be a system containing no attached terminals or only a single operators console containing only a single user display and keyboard input. Furthermore, while certain functions of the invention herein are described for illustrative purposes as embodied in a single computer system, these functions could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 200 is a computer system based on the IBM AS/400™ or i/Series™ architecture, it being understood that the present invention could be implemented on other computer systems.

Figure 3:
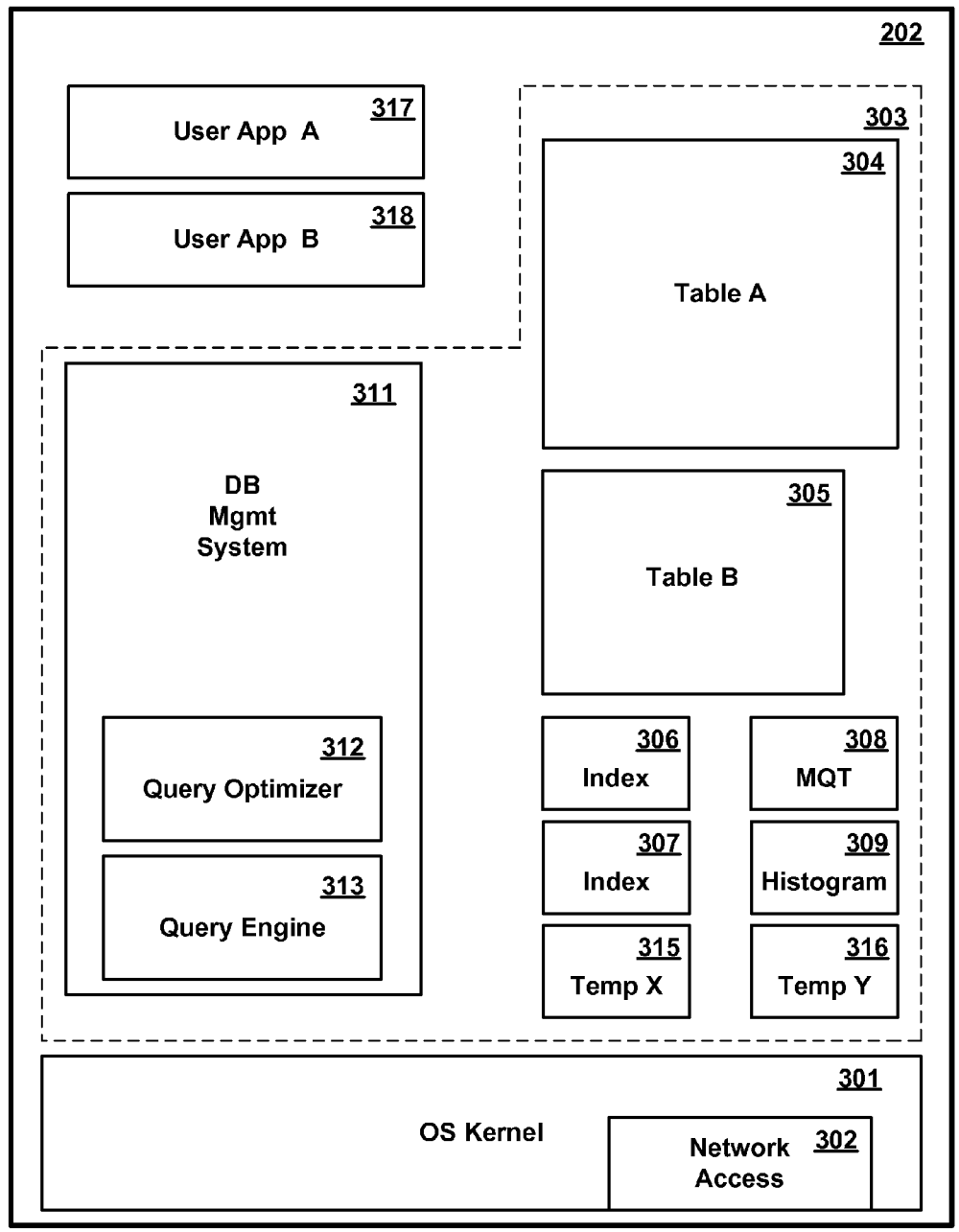
FIG. 3 is a conceptual illustration of the major software components of a computer system for maintaining a database, according to the preferred embodiment.

FIG. 3 is a conceptual illustration of the major software components of database system 101, represented as components of memory 202, according to the preferred embodiment. Operating system kernel 301 is executable code and state data providing various low-level software functions, such as device interfaces, management of memory pages, management and dispatching of multiple tasks, etc. as is well-known in the art. In particular, operating system 301 includes at least one network access function 302. Network access function 302 is software which communicates through network interface 214 with one or more external networks, particularly network 104. Network access function 302 generally handles network communications on behalf of applications executing in database server system 101, which specifically includes database management system 311. Although network access function 302 is shown as part of operating system kernel 301, it could alternatively be a separate software module.

A structured database 303 contains data which is maintained by database system 101 and for which the system provides access to multiple users (clients). Database 303 contains one or more tables 304, 305 (of which two are shown in FIG. 3), each having a plurality of entries or records, each entry containing at least one (and usually many) fields, as is well known in the art. Database tables 304, 305 might contain almost any type of data which is provided to users by a computer system. Associated with the database tables are one or more auxiliary data structures 306-309, also sometimes referred to as metadata. Auxiliary data structures characterize the structure of the database and data therein, and are useful in various tasks involved in database management, particularly in executing queries against the database. Examples of auxiliary data structures include database indexes 306-307, materialized query table 308, and histogram 309, it being understood that other types of metadata may exist.

Database management system 311 provides basic functions for the management of database 303. Database management system 311 may theoretically support an arbitrary number of database tables, which may or may not have related information, although only two tables are shown in FIG. 3. Database management system 311 preferably allows users to perform basic database operations, such as defining a database, altering the definition of the database, creating, editing and removing records in the database, viewing records in the database, defining database indexes, and so forth. Among the functions supported by database management system 311 is the making of queries against data in database tables 304, 305. Query support functions in database management system 311 include query optimizer 312 and query engine 313. Optimizer 312 generates query execution strategies for performing database queries according to any of various techniques now known or hereafter developed, i.e. sequences of steps in which records will be examined for satisfaction of the query conditions. Engine 313 executes the queries according to strategies developed by optimizer 312.

Database management system 311 may further contain any of various more advanced database functions. Although database management system 311 is represented in FIG. 3 as an entity separate from operating system kernel 301, it will be understood that in some computer architectures various database management functions are integrated with the operating system.

In addition to internal state information and other data, database management system 311 may generate numerous temporary data structures during execution, represented as data structures 315-316. These temporary structures in particular are often generated during query execution to hold intermediate query results. The number of such temporary structures can vary considerably, and could be much larger.

Although one database 303 having two database tables 304, 305, two indexes 306-307, one MQT 308 and one histogram 309 are shown in FIG. 3, the number of such entities may vary, and could be much larger. The computer system may contain multiple databases, each database may contain multiple tables, and each database may have associated with it multiple indexes, MQTs, histograms, or other auxiliary data structures not illustrated. Alternatively, some entities represented in FIG. 3 might not be present in all databases; for example, some databases might not contain materialized query tables or the like. Additionally, database 303 may be logically part of a larger distributed database which is stored on multiple computer systems. Although database management system 311 is represented in FIG. 3 as part of database 303, the database management system, being executable code, is sometimes considered an entity separate from the "database", i.e., the data.

In the preferred embodiment, at least some of the clients using the database access the database through middle tier system 102, which generates requests for service to, and receives responses from, database management system 311. However, database system 101 may optionally include additional user applications 317, 318, which directly use command interface 314 or some other mechanism to call database management system 311 to access information in database 302, without passing requests through middle tier system 102. Alternatively, while a user application will typically invoke database management system to access data in the database, a user application could access the database tables directly using its own built-in access routines.

Figure 4:
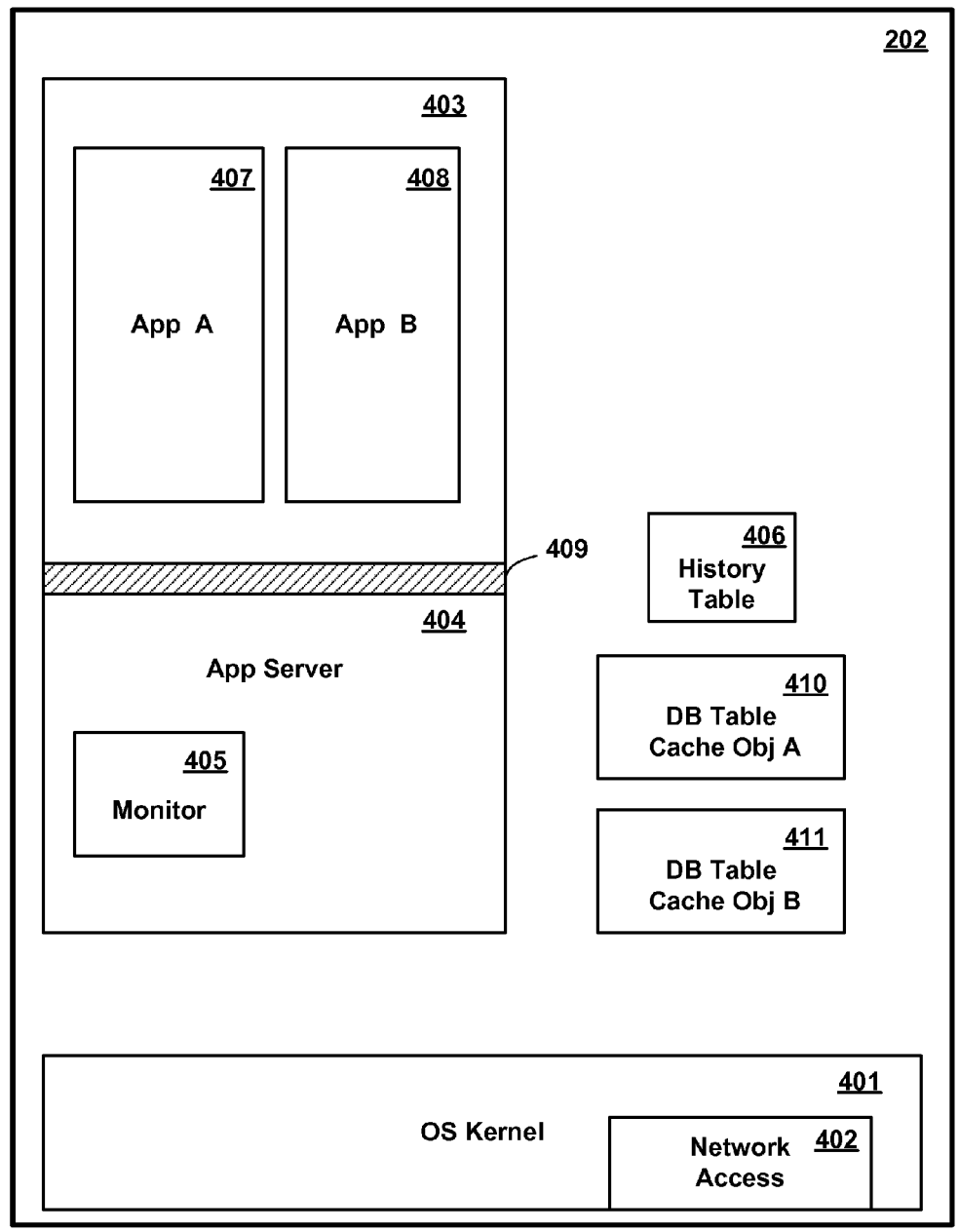
FIG. 4 is a conceptual illustration of the major software components of a computer system operating a middle tier facility, according to the preferred embodiment.

FIG. 4 is a conceptual illustration of the major software components of middle tier system 102, represented as components of memory 202, according to the preferred embodiment. Operating system kernel 401 and network access function 402 provide function analogous to those of operating system kernel 301 and network access function 302, respectively, of database system 101. While the functions provided are analogous, operating systems 301 and 401 are not necessarily identical (although they could be). Network access function 402 communicates through network interface 214 to networks 104, 105, which could be separate networks operating under different protocols, separate networks operating under the same protocol, or the same network. In the preferred embodiment, network 105 is the Internet.

A middle tier server facility 403 acts as client representative to access one or more databases, and in particular to access database 303. In the preferred embodiment, middle tier facility 403 presents an interactive world wide web interface to multiple clients 103 which communicate with middle tier system 102 over the Internet. I.e., middle tier facility 403 generates interactive web pages in HTML or other appropriate format for viewing by web browser applications executing in client systems 103. To clients 103, middle tier facility 403 functions as the server, and clients are unaware of any applications behind middle tier facility 403. However, in some transactions the middle tier in reality functions as an intermediary. It translates data received from clients 103 (such as request for access to database 303) from HTML or other web-based form to a form compatible for use by database management system 311, i.e., to a command format compatible with command interface 314. It further receives responses to its requests from database management system 311 in the native format of the database, and converts the information in these responses to some form appropriate for the client, such as a web-based format.

In the preferred embodiment, middle tier facility 403 comprises an application server 404, and one or more middle tier applications 407, 408 (of which two are illustrated in FIG. 4, it being understood that the number could vary). Application server 404 is a framework or shell for generally supporting database accesses on behalf of the applications 407, 408 of the middle tier. Among other features, application server 404 contains a set of functions (connection facilities) for accessing databases in a variety of commonly used native database formats. The applications 407, 408 are code developed for performing some set of specific server functions on behalf of clients 103, at least some of which require access to the database. The applications 407, 408 receive client requests and make a determination to access data in a database as required. If database access is required by an application 407, 408, it invokes the connection facilities of application server 404 to access the database. Application server 404 receives responses from the database, which are generally forwarded to the appropriate application. Applications 407, 408 communicate with application server 404 across a common interface 409, which is independent of the application or database to be accessed. In the preferred embodiment, interface 409 conforms to a JAVA 2 Enterprise Edition (J2EE) interface specification, although other interfaces might alternatively be used. In the preferred embodiment, application server 404 is a modified version of the IBM WEBSPHERE™ application server, it being understood that other forms of application server facility could alternatively be used.

Application server 404 includes an interface monitoring function 405 which monitors database accesses across interface 409 and maintains access history table 406. Monitoring function 405 records in access history table 406 a history of accesses to specific fields within one or more database tables, preferably in the form of respective counters. This data is used to determine which fields should be requested from database 303 when the database is accessed on behalf of an application 407, 408, as explained in further detail herein.

Middle tier system 102 further includes a plurality of local database table cache objects 410, 411, of which two are illustrated in FIG. 4, it being understood that this number may vary, and it typically much larger. Each cache object 410, 411 is managed by application server 404, and temporarily stores some respective portion of a database table 304, 305 from database 303. Specifically, each cache object typically stores some relatively small subset of the total number of entries or records in a corresponding database table. Furthermore, with respect to each database table entry or record stored in a cache object 410, 411, the cache object may contain all the fields of the corresponding entry (i.e., all the fields that are in the database table from which the entry was derived), or may contain only some subset of the fields of the corresponding entry. When an application 407, 408 invokes the connection facilities of application server 404 to obtain database data, the application server will attempt to satisfy the request for database data from the existing cache objects, and if required to access database 303 in order to obtain the data, will temporarily store data obtained in a local cache object for possible later access. In this manner, the existence of the local cache objects is hidden from applications 407, 408. In the preferred embodiment, each cache object 410, 411 is a data structure conforming to the Enterprise JAVA Bean (EJB) specification promulgated by Sun Microsystems, it being understood that a cache object might use any suitable alternative structure.

Various software entities are represented in FIGS. 3 and/or 4 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIGS. 3 and 4, it will be understood that the actual number of such entities may vary, and in particular, that in a complex database server environment, the number and complexity of such entities is typically much larger. Additionally, although the various software components are depicted in FIGS. 3 and 4 on two computer systems, these entities might alternatively be contained on a single computer system, or might be distributed among a number of systems larger than two. For example, user applications may be on a separate system from the database; database table data may be distributed among multiple computer systems, so that queries against the database are transmitted to remote systems for resolution, and so forth.

While the software components of FIGS. 3 and 4 are shown conceptually as residing in memory 202, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. In particular, database 303 is typically much too large to be loaded into memory, and typically only a small portion of the total number of database records is loaded into memory at any one time. The full database 303 is typically recorded in disk storage 125-127. Furthermore, it will be understood that the conceptual representation of FIGS. 3 and 4 is not meant to imply any particular memory organizational model, and that system 101 or system 102 might employ a single address space virtual memory, or might employ multiple virtual address spaces which overlap.

Figure 5:
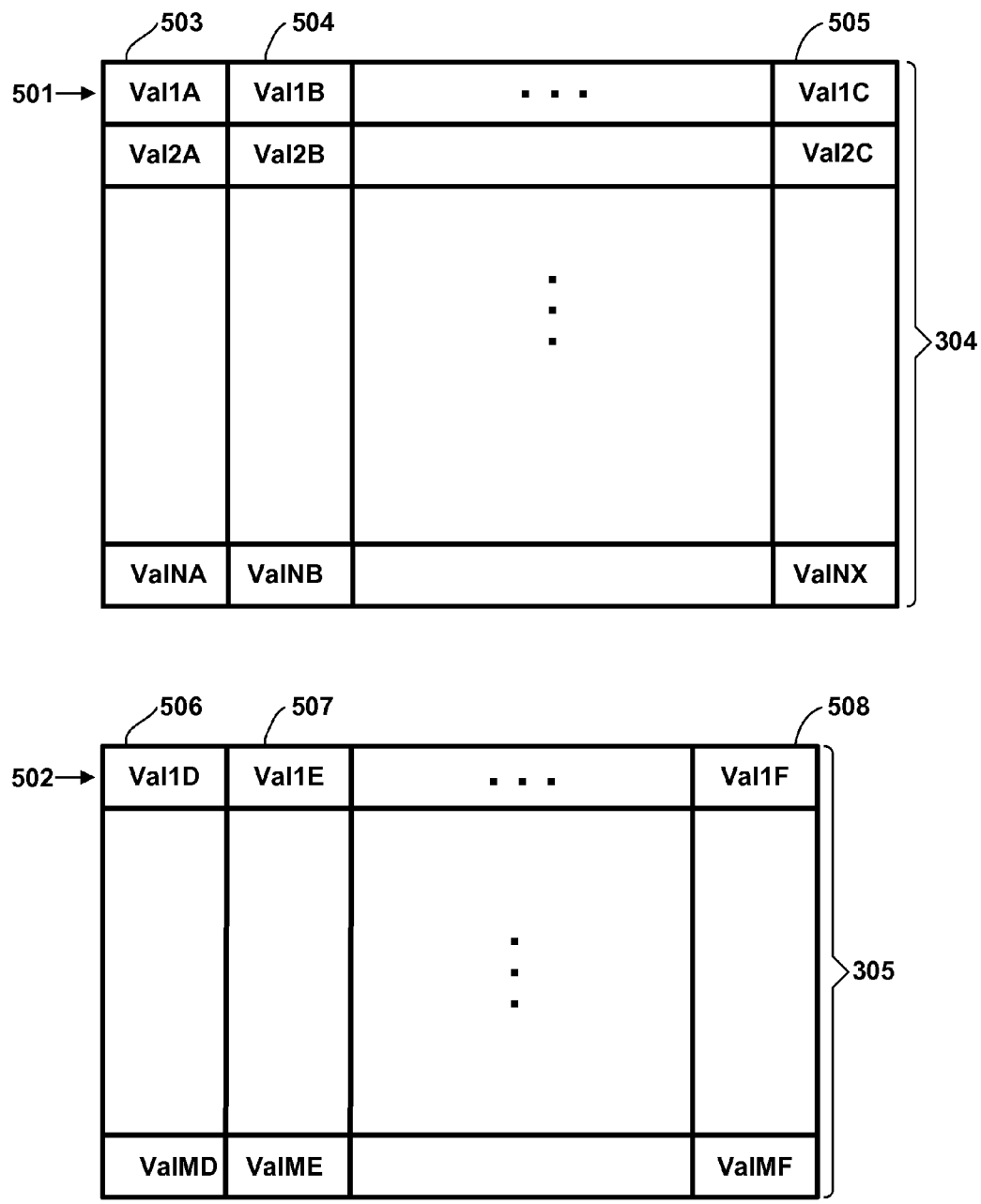
FIG. 5 is a conceptual representation of the structure of database tables, according to the preferred embodiment.

FIG. 5 is a conceptual representation of the structure of database tables 304, 305, according to the preferred embodiment. Each database table 304, 305 contains multiple respective database entries (also called records, or rows) 501, 502, each entry containing multiple data values logically organized as multiple data fields, fields 503-505 being illustrated as belonging to table 304, and fields 506-508 belonging to table 305. Each database table 304, 305 is conceptually represented in FIG. 3 as a table or array, in which the rows represent database entries or records, and the columns represent data fields. However, as is well known in the art, the actual structure of the database in memory typically varies due to the needs of memory organization, accommodating database updates, and so forth. A database table will often occupy non-contiguous blocks of memory; very large tables may be partitioned into multiple files or other structures; database records may vary in length; some fields might be present in only a subset of the database records; and individual entries may be non-contiguous. Portions of the data may even be present on other computer systems. Various pointers, arrays, and other structures (not shown) may be required to identify the locations of different data contained in the database. Furthermore, as is known in database design, it is common for a field in one table to serve as an index to an entry in another table, thus referencing additional data in another table; such an index is sometimes referred to as a "surrogate key" or "foreign key".

Figure 6:
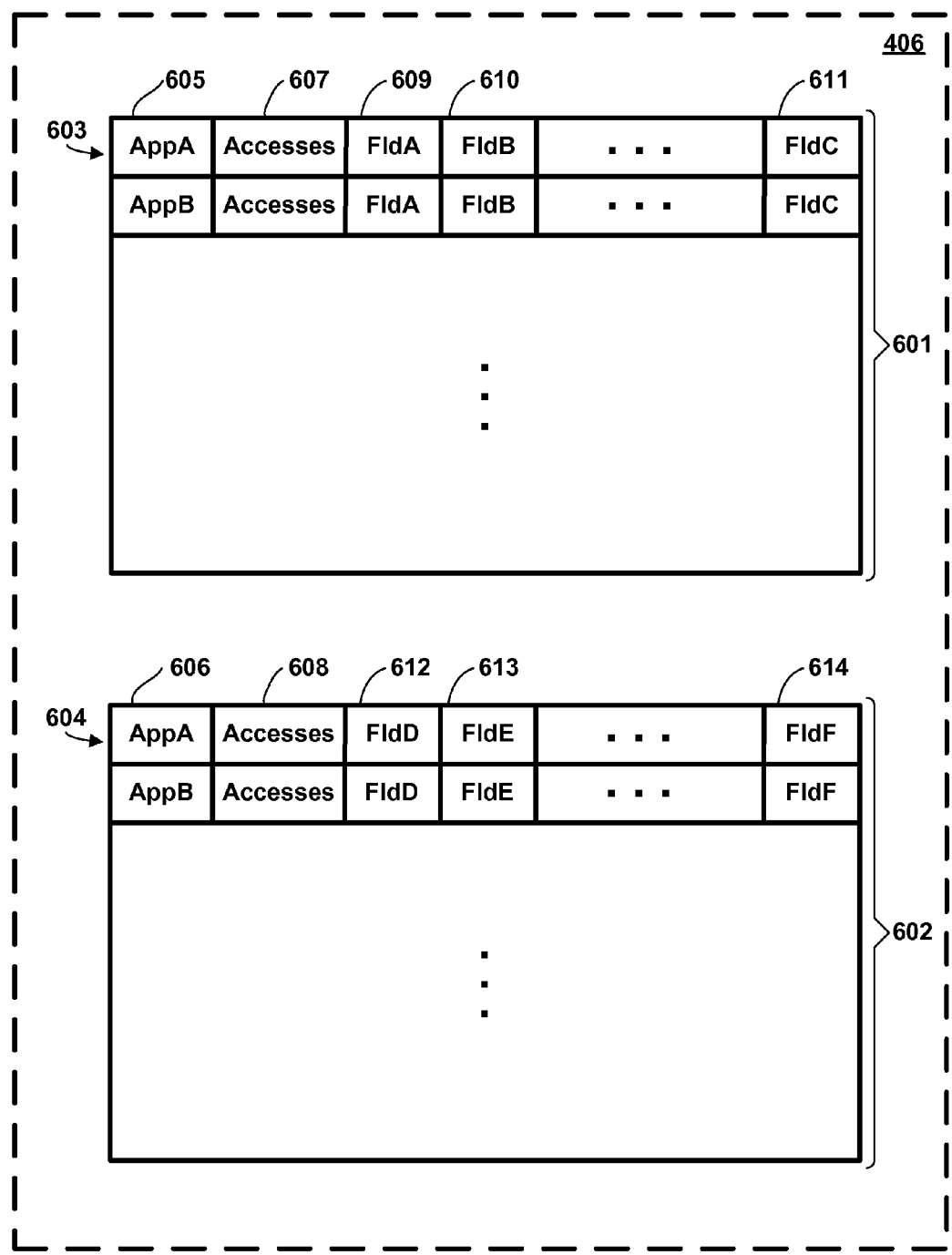
FIG. 6 is a conceptual representation of the structure of an access history table, according to the preferred embodiment.

FIG. 6 is a conceptual representation of the structure of access history table 406, according to the preferred embodiment. Access history table 406 comprises multiple separate sections or sub-tables 601, 602, of which two are illustrated in FIG. 6. Each section or sub-table 601, 602 corresponds to a respective database table 304, 305, and has a structure dictated by the number of fields in the database table to which it corresponds. I.e., the structures of different sub-tables 601, 602 of access history table may vary depending on the number of fields in the database tables to which the sections correspond.

Each sub-table 601, 602 of access history table 406 contains a respective set of one or more entries or records 603, 604 (represented as rows of the respective sub-tables). Each entry 603, 604 corresponds to a respective middle tier application 407, 408. In any one sub-table, there is one and only one entry corresponding to each respective middle tier application; however, since the access history table may contain multiple sub-tables, there could be multiple entries corresponding to the same middle tier application.

Each entry 603, 604 contains a respective middle tier application identifier 605, 606, access counter 607, 608, and field counters 609-614. Middle tier application identifier 605, 606 identifies the middle tier application to which the sub-table entry corresponds. Access counter 607, 608 contains a count of the number of access requests made by the corresponding middle tier application to data in the database table to which the sub-table corresponds, i.e., the number of such data requests which cross interface 409. (This number is not necessarily the same as the number of requests serviced by database 303, because some requests might be satisfied from data cached in a local table cache object 410, 411.) Each field counter 609-614 corresponds to a respective field of the database table to which the sub-table corresponds. E.g., field counters 609-611 correspond to respective fields 503-505 of database table 304, while field counters 612-614 correspond to respective fields 506-508 of database table 305. Each field counter contains a count of the number of access requests made by the corresponding middle tier application which included the corresponding field.

In accordance with the preferred embodiment, application server 404 provides a means for middle tier applications 407, 408 to access data in database 303. Application server 404 therefore functions as a server to the middle tier applications. Access requests by applications 407, 408 cross interface 409, application server obtains the requested data, and the data is returned over the interface to the requesting applications. The middle tier applications are not concerned with how the application server obtains the requested data as long as the interface protocol is observed. Monitoring function 405 monitors access requests which cross interface 409, and increments the appropriate counters in access history table 406 to maintain an accurate count of fields accessed by each respective middle tier application. These counters are used by the application server to determine which fields should be requested from database 303 and cached in a local cache object 410, 411.

Figure 7:
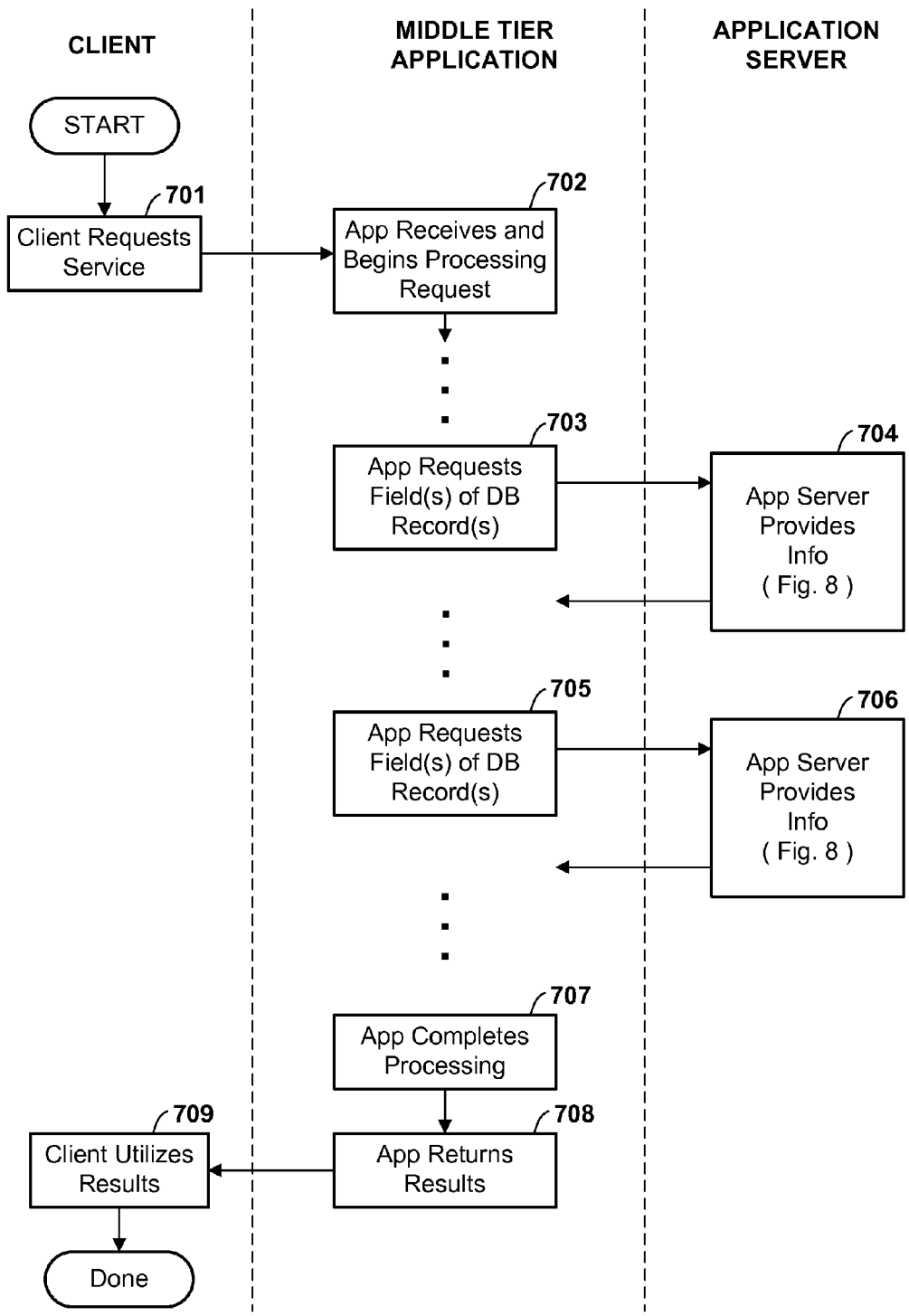
FIG. 7 is a flow diagram illustrating at a high level the process of servicing a client request for database access through the middle tier system, according to the preferred embodiment.

FIG. 7 is a flow diagram illustrating at a high level the process of servicing a client request for database access through the middle tier system, according to the preferred embodiment. Referring to FIG. 6, the flow diagram is divided into three partitions running vertically, these indicating the actions performed at each of the client, the middle tier application, and the application server. A client formulates a request for service which requires access to information contained in one or more databases in a form convenient to the client (step 701). In the preferred embodiment, the client executes an interactive web browser process, and the request is formulated by interactively entering appropriate information in entry fields of a web page provided by the middle tier system. However, formulation of the request at the client could be accomplished by different means, need not be interactive, and need not use web-based protocols. The request formulated by the client is transmitted to the middle tier system for handling by middle tier application.

On receipt of the request from the client, the middle tier application begins processing the request (step 702). Processing may involve an arbitrary number of steps of arbitrary complexity, depending on the purpose of the middle tier application. At some point during processing, the application requires access to data maintained by database 303, and formulates a request for such data according to the requirements of interface 409 (step 703). Such a request will identify the database table or tables from which data is to be obtained, and the field or fields of those tables to be obtained. A request could be something so simple as a request for a value of a single field in a single database record, or could be a complex query requesting all database records (or selective fields of such database records) satisfying some set of logical conditions, as is known in the art. This request is passed across interface 409 to application server 404.

Application server 404 then services the request, i.e., obtains the requested data. The process of servicing the request within the application server is represented in FIG. 6 as step 704, and shown in greater detail in FIG. 7. The data is passed back across interface 409 to the requesting middle tier application.

A single client request may cause the middle tier application to generate multiple requests for data, which may be directed to a single database or to multiple different databases. Typically, the client only requests service in a general sense without reference to specific databases, and the middle tier application determines the location (or multiple locations) of the data to be accessed. As illustrated in FIG. 7, the middle tier application requests data a second time (step 705), and the application server provides the requested data in response to the second request (step 706). Although two requests for data by the middle tier application are illustrated in FIG. 7, the number of such requests required to service a single request by the originating client may vary, and could be considerable.

At some point, the middle tier application completes processing of the request (step 707), and returns results to the requesting client (step 708). Upon receipt, the client uses the response in accordance with its intention (step 611). In the preferred embodiment, a web browser in the client renders the response into a user viewable web page displaying the requested data, acknowledging a transaction, or providing some other information.

Figure 8:
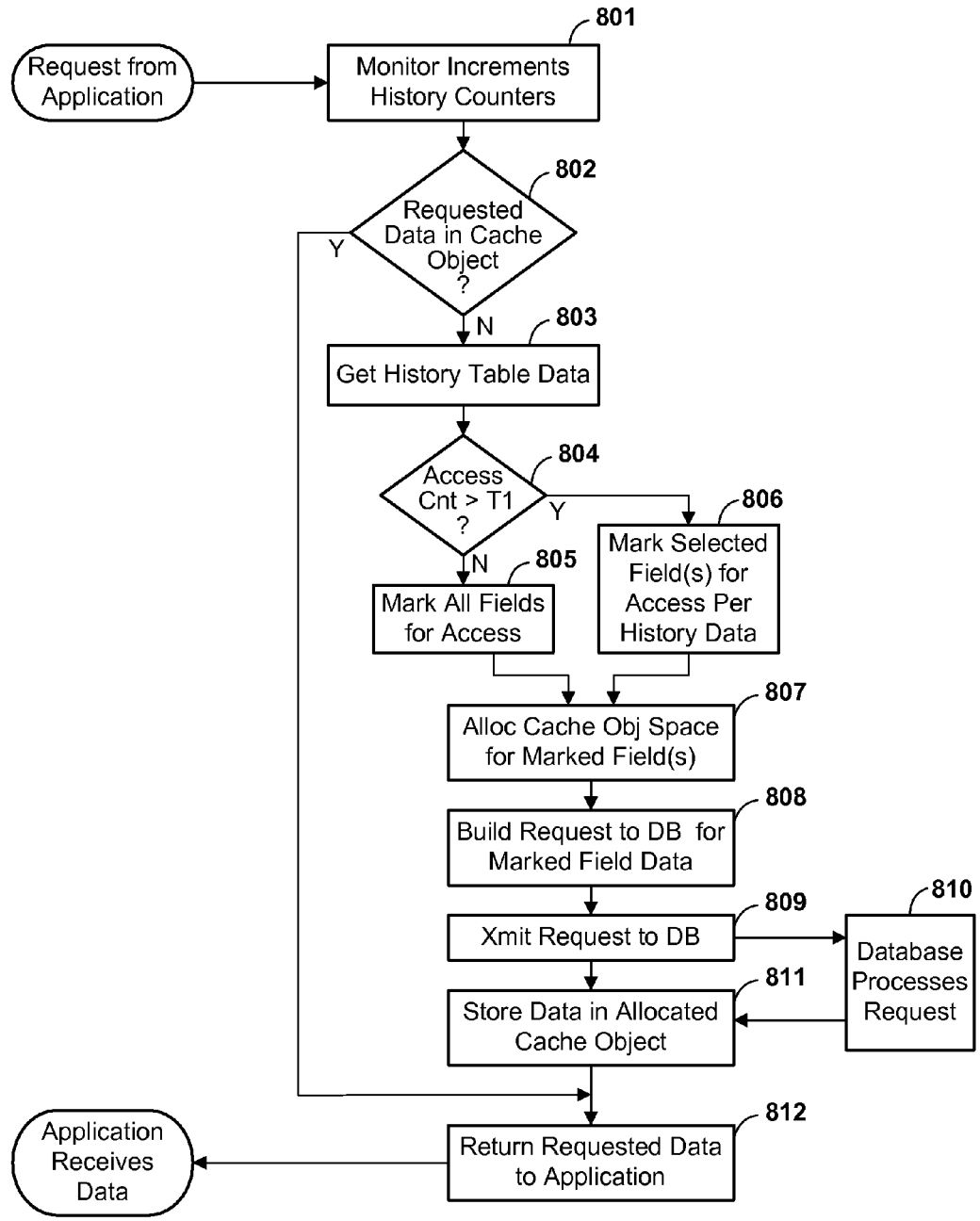
FIG. 8 shows in greater detail a process in an application server of responding to a data request from a middle tier application, according to the preferred embodiment.

FIG. 8 shows in greater detail the application server's process of responding to a data request from a middle tier application, represented in FIG. 7 as either step 704 or 706. Referring to FIG. 8, upon receipt of a request for data, monitoring function 405 increments the corresponding counters in access history table 406 (step 801). Specifically, the monitoring function increments the access count 607, 608 of each entry 603, 604 corresponding to the middle tier application requesting access and contained in a sub-table 601, 602 corresponding to a database table 304, 305 containing data to be accessed. The monitoring function further increments each field count 609-614 within such an entry 603, 604 corresponding to a field in a database table to be accessed. It will be recalled that a data request may request all fields of a table (in which case all field counts 6109-614 in the corresponding entry will be incremented), or may request only some subset of fields (in which case only the field counts 609-614 corresponding to the requested subset of fields will be incremented). A request may request data from a single table, or from multiple tables.

The application server then determines whether the request can be satisfied from the local database table cache objects 410, 411. If all of the requested data is available in one or more local cache objects, the 'Y' branch is taken from step 802 to step 812, and steps 803-811 are by-passed.

If any requested data is not available, the application server must obtain the data from database 303, and the 'N' branch is taken from step 802. In this case, the application server refers to the access history table to determine which fields should be accessed (step 803). I.e. the application server obtains the entry 603, 604 from a sub-table 601, 602 which corresponds to the requesting middle tier application and database table to be accessed. (For clarity of illustration, it is assumed herein that only one table will be accessed, it being understood that, where multiple tables are accessed, steps 803-806 could be repeated for each separate table to be accessed.) If the access count 607, 608 is less than some minimum threshold T1 (step 804), then the data sample in the history table is considered too small to be reliable. T1 is preferably a pre-determined, fixed quantity. In this case, the 'N' branch is taken from step 804, and all fields of the applicable database table entry will be marked for access (step 805).

If the 'Y' branch is taken from step 804, the application server marks selective fields of the requested database table for access (step 806). Accessing only selective fields is done in order to reduce the burden on certain resources, particularly network resources for transmitting the requested data across a network from database system 101 to middle tier system 102, and local storage resources within middle tier system 102 for storing database table cache objects 410, 411. It should be understood that it is generally far more resource consumptive to access field A and field B of a database record in separate requests, than to access the same data in a single request. Therefore, if it is at all likely that a request for field A will be followed by a request for field B in the near future, it is better to obtain both fields when accessing field A, so that it is not necessary for the application server to go to the database a second time. But where field B is extremely unlikely to be requested in the near future, it may be better to request only field A.

In the preferred embodiment, the fields marked for access at step 806 include: (a) any fields specifically requested by the requesting middle tier application; and (b) any fields which meet a minimum history of access threshold T2. Threshold T2 may be variable or fixed. In a first alternative embodiment, T2 is fixed at 1, i.e., any field which has ever been accessed by the requesting application is marked for access. This first alternative is relatively simple to implement, and is inclusive in the sense that it will obtain all fields which have been used at all by the requesting application, leaving out only those fields which have never been used (and therefore probably never will be used). However, this first alternative may suffer from over inclusion, in that it may request fields which are only used very rarely (e.g., for recovering from errors, handling unusual conditions, etc.). In a second alternative embodiment, T2 is a variable threshold which is some relatively small fraction of the value of the access count. For computational purposes, a suitable relatively small fraction can be obtained by shifting the access count some number of binary digits, e.g. 7 digits to obtain a fraction of $\frac{1}{128}$. If a requested field is accessed with a frequency at least the applicable fraction, then it will be marked for inclusion in the database access request; if it is accessed less frequently, it will not be included (unless it was specifically requested by the middle tier application). This second alternative embodiment thus avoids unnecessarily accessing fields which are only rarely used. A variable threshold according to the second alternative embodiment could alternatively include other or additional factors; for example, the length of the field could be considered in determining whether to mark it for access (smaller fields having a generally lower threshold T2 for access). Furthermore, although a determination is described herein as being dynamically made each time an access is to be made, it would alternatively be possible to determine which fields should be accessed on a periodic or other basis, particularly where more complex computations might be involved in making such a determination. For example, on a periodic basis (such as every Nth access from the application), the application server could re-evaluate the fields to be included in any access request, and mark a bit array or similar data structure (not shown) to indicate the fields to be accessed.

After appropriate fields are marked for access at steps 805 or 806, application server allocates space in a database table cache object 410, 411 for the data to be obtained from the database (step 807). Specifically, space is allocated of sufficient size to accommodate the marked fields, but not necessarily other fields of a database table which were not marked above. Thus, by marking only selective fields at step 806, the size of the allocation made at step 807 can be reduced.

The application server builds a request to the database for the database table entries indicated by the original request from the middle tier application, including only those fields of the database table entries which were marked at steps 805 or 806 (step 808). This request is then transmitted to database 303 (step 809), which typically, although not necessarily, involves transmission across a network. Database 303 processes the request and returns the requested data (step 810). The returned data is stored in the previously allocated local cache object (step 811). This returned data may include more data (i.e., more fields of a record) than was originally requested by the application. The application server then returns the data requested by the application (step 812).

As described above, the values in history table 406 simply accumulate over time. However, there may be reason to age or sometimes invalidate data in history table 406. For example, if a particular application is altered with a new version of the same application, then the pattern of data accesses can no longer be deemed reliable. Furthermore, changes to data in the database or other environmental changes may cause incremental shifts in the pattern of fields accessed by an application over time. In the preferred embodiment, if an application is modified, then each entry in the history table corresponding to that application is reset to zeroes, so that stale data does not skew future results. Other conventional techniques for aging data could be used to address incremental changes in the pattern of database fields access by an application over time.

Among the advantages of the technique described herein as a preferred embodiment is that it can achieve significant reduction in resource utilization when accessing a database, particularly across a network, while still using a program development shell or framework having a standard interface. Because the application server of the preferred embodiment conforms to the standard interface with the applications it supports, application developers may use and re-use any of numerous programming objects to design their applications, thus holding down development costs.

In the preferred embodiment, the application server and application together form a middle tier facility which acts as a server to multiple clients, preferably connected to the middle tier over a network, and represents those clients when accessing the database. However, in an alternative embodiment, there might be only two tiers of client and server, in which the application (and application server) form the client and the database the server. I.e., in this alternative embodiment, there are no other clients which originate requests for service, and the requests originate from the application itself. Furthermore, although the transactions which are intended to obtain database data are generally referred to herein as "requests", consistent with a typical client-server model, it will be understood that, depending on the system architecture, these might alternatively be characterized as "commands", "function calls", or the like.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as communications networks. Examples of signal-bearing media are illustrated in FIG. 2 as system memory 202, and as data storage devices 225-227.

Although a specific embodiment of the invention has been disclosed along with certain alternatives, it will be recognized by those skilled in the art that additional variations in form and detail may be made within the scope of the following claims:

What is claimed is:

1. An application server computer program product for accessing a database, said application server providing database access functions for one or more applications, comprising:

a plurality of computer-executable instructions recorded on non-transitory computer-readable media, wherein said instructions, when executed by at least one computer system, cause the at least one computer system to perform the steps of:

maintaining historical data concerning data from said database required by said one or more applications, said database having at least one database table, each database table of said database defined by a respective set of fields and containing a respective plurality of entries, each entry having respective data in the set of fields defining the respective database table;

receiving data requests from said one or more applications, said data requests requesting data contained in said database, said data requests conforming to a common database-independent interface; and responsive to at least some of said data requests, generating a respective request to access said database, each said request to access said database identifying a respective subset of one or more fields defining at least one database table of said database to be returned responsive to the request;

wherein, for at least some said requests to access said database, said respective subset contains at least one and fewer than all the fields defining a first database table of said database;

wherein each said respective subset of one or more fields of said database is determined by said application server using data of said historical data other than the data request responsive to which the respective subset is generated.

2. The application server computer program product of claim 1, wherein said one or more applications are middle tier applications which perform services for a plurality of clients communicating with said middle tier applications across a network.

3. The application server computer program product of claim 1, wherein said requests to access said database are transmitted across a network to at least one database computer system other than said at least one computer system executing said plurality of computer-executable instructions of said application server.

4. The application server computer program product of claim 3, where said application server receives responses to said requests to access said database and caches data contained in said responses to said requests to access said database in said at least one computer system executing said plurality of computer-executable instructions of said application server for use in responding to subsequent data requests.

5. The application server computer program product of claim 1, wherein said application server generates said historical data by monitoring said data requests and recording fields defining one or more database tables of said database requested by said one or more applications.

6. The application server computer program product of claim 1,
wherein said application server generates separate said historical data for each of a plurality of said applications; and
wherein said application server uses said separate historical data corresponding to a requesting application which issued the data request to which the request to access the database is responsive.

7. A requesting computer system for accessing a database on at least one database computer system, said database containing a plurality of fields, comprising:
at least one processor;
a memory for storing data including instructions executable on said at least one processor;
a database access facility embodied as instructions storable in said memory and executable on said at least one processor for accessing data in a database, said database having at least one database table, each database table of said database defined by a respective set of fields and containing a respective plurality of entries, each entry having respective data in the set of fields defining the respective database table, said database access facility responding to data requests for database data from a plurality of requesting entities, at least some of said requests requiring access to said database, said database access facility generating requests to access said database responsive to at least some of said data requests, each said request to access said database identifying a respective subset of one or more fields defining one or more database tables said database to be returned responsive to the request;
wherein said database access facility generates historical data selectively identifying fields defining one or more database tables of said database which contain data required by said requesting entities; and
wherein said database access facility automatically determines each said respective subset of one or more fields defining one or more database tables of said database using said historical data selectively identifying fields defining one or more database tables of said database which contain data required by said requesting entities.

8. The requesting computer system of claim 7, wherein said database access facility comprises an application server providing database access function to at least one application, said application server communicating with said database using an interface defined by said database, and providing a common database-independent interface for communication with said at least one application.

9. The requesting computer system of claim 8, wherein said at least one application is a middle tier application which performs services for a plurality of clients communicating with said middle tier application across a network.

10. The requesting computer system of claim 7, wherein said requesting computer system and said at least one database system are separate computer systems, said requesting computer system communicating with said at least one database computer system across a network.

11. The requesting computer system of claim 10,
wherein said database access facility receives responses to said requests to access said database and caches data contained in said responses to said requests to access said database in said requesting computer system for use in responding to subsequent data requests.

12. The requesting computer system of claim 7, wherein said database access facility generates said historical data by monitoring said data requests and recording fields requested by said requesting entities in said data requests.

13. The requesting computer system of claim 7,
wherein said database access facility generates separate said historical data for each of a plurality of respective requesting entities issuing data requests; and
wherein said database access facility uses said separate historical data corresponding to a requesting entity which issued the data request to which the request to access the database is responsive.

* * * * *